(12) United States Patent  (10) Patent No.: US 6,193,182 B1
Capra  (45) Date of Patent: Feb. 27, 2001

(54) FLY-FISHING REEL

(76) Inventor: Silvano Capra, Pizze V. Veneto 24, 13842 Valle S. Nicolao, Biella (IT)

(*) Notice: Subject to any disclaimer, the term of this patent is extended or adjusted under 35 U.S.C. 154(b) by 0 days.

(21) Appl. No.: 09/531,133

(22) Filed: Mar. 17, 2000

(51) Int. Cl.$^7$ ................................................. A01K 89/02
(52) U.S. Cl. ......................... 242/292; 242/264; 242/301; 242/303
(58) Field of Search .................................. 242/243, 244, 242/245, 264, 270, 285, 290, 292, 301, 302, 303, 304, 317

(56) References Cited

U.S. PATENT DOCUMENTS 4,352,474 * 10/1982 Kovalovsky ........................ 242/270
5,118,048 * 6/1992 Childre et al. ..................... 242/245
5,626,303 * 5/1997 Bringsen .............................. 242/303

* cited by examiner

Primary Examiner—Donald P. Walsh
Assistant Examiner—Emmanuel M. Marcelo
(74) Attorney, Agent, or Firm—Austin R. Miller

(57) ABSTRACT

A fly-fishing reel is equipped with a primary braking system, operated by actuating means separate from a handle allowing the fisherman to rotate the spool in a direction for winding the line, and an ancillary braking system, operable in addition to the primary braking system by means of the handle of the spool. The ancillary braking system comprises a pair of brake shoes which are eccentrically pivoted on the handle and which, upon rotation of the handle in direction opposite to that required for winding the line, are caused to pivot on the handle itself so that an outer edge frictionally engages the wall of a housing provided in the spool.

5 Claims, 3 Drawing Sheets

FLY-FISHING REEL

FIELD OF THE INVENTION

The present invention relates to fishing rods and more particularly it concerns a fly-fishing reel for one such rod, equipped with an improved braking mechanism for the line spool.

BACKGROUND OF THE INVENTION

A commonly adopted solution for the braking mechanism of the line spool in fly-fishing reels makes use of a clutch mechanism comprising brake disks which can be moved in or out of frictional engagement for braking the spool or letting it freely rotate, respectively. The braking action is adjustable by screwing/unscrewing a suitable actuating member, such as a nut or a knob.

An example of fly-fishing reel equipped with a braking mechanism of this type is disclosed in United Kingdom Patent Application No. 2,203,211.

The drawback of such prior art mechanisms is that the means for adjusting the braking action are to be operated separately from the handle used to wind the line. Now, while retrieving a fish hooked on the line, a fisherman must frequently alternate between winding the line and paying out it with different braking forces. Thus he must frequently alternate his hand between the winding handle and the knob or other actuating member of the braking mechanism. Even in cases in which that member is located near the winding handle, like in the above-mentioned U.K. patent application, that frequent alternation is annoying and makes the retrieve operation rather difficult.

SUMMARY OF THE INVENTION

It is an object of the present invention to provide a fly-fishing reel comprising an improved braking system which eliminates the need for the fisherman to continuously alternate his hand between the winding handle and the actuating member of a braking mechanism.

According to the invention, a fly-fishing reel includes: a spool for a fishing line; a frame on which said spool is rotatably mounted so as to allow payout and winding of the line; means for securing the frame to a fishing rod; a handle for rotating the spool at least in a first direction in order to wind the line on the spool; primary braking means arranged to exert a first adjustable braking action on said spool and equipped with actuating means operated independently from said handle, and ancillary braking means operable in addition to said primary braking means to exert a second adjustable braking action on said spool, said second ancillary braking means being operatively connected to said handle so as to be operated upon rotation of said handle in a second direction, opposite to the first one.

According to a preferred feature of the invention, the ancillary braking system includes a pair of brake shoes fastened on a first surface of said handle so as to be integral for rotation with the handle and arranged so as to be housed within a hollow in the spool, and said brake shoes are fastened to said first surface through eccentrically located pivot means whereby said brake shoes are pivotally movable on said handle between an inactive condition, in which outer edges of the brake shoes are spaced apart from a confronting wall of said hollow, and a braking condition, in which said outer edges frictionally engage said confronting wall.

To achieve the pivotal movement, the brake shoes are each provided with a slot having a cam profile and said slots are each engaged by a respective pin projecting from a member which is integral for rotation with the handle and the brake shoes when the handle is rotated in said first direction, and which remains stationary when the handle is rotated in said second direction, so that the pins slide within the respective slot.

BRIEF DESCRIPTION OF THE DRAWINGS

A preferred embodiment of the invention will be now described with reference to the accompanying drawings, in which.

DETAILED DESCRIPTION OF THE PREFERRED EMBODIMENT

Figure 1:
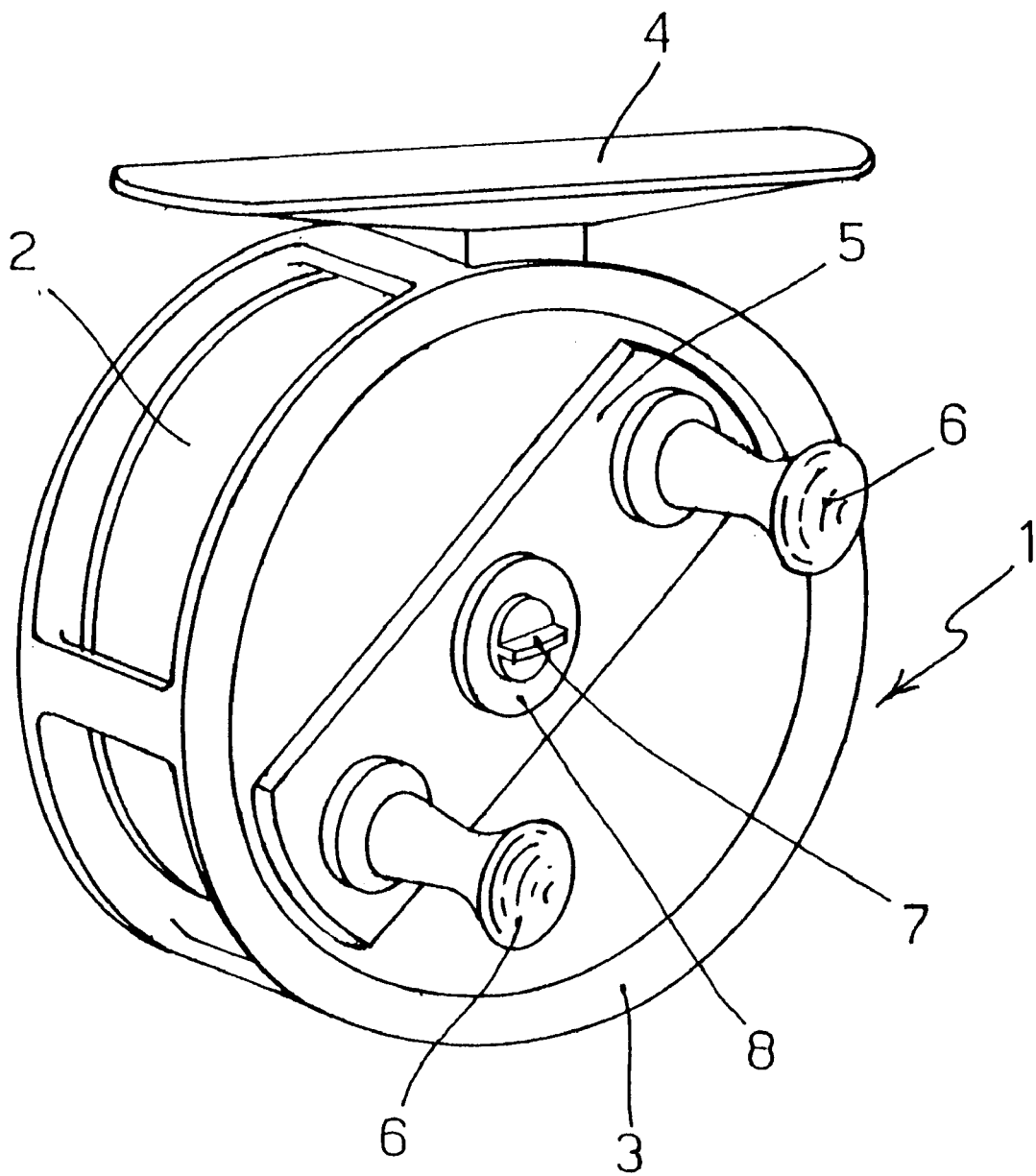
FIG. 1 is a perspective view of a fly-fishing reel embodying the present invention.

Referring to FIG. 1, a fly-fishing reel 1 comprises a line spool 2 rotatably arranged within a frame 3 which can be secured through a bracket 4 to a fishing rod (not shown). Spool 2 is associated with a handle 5, equipped e. g. with a pair of operating knobs 6, for rotating the spool in order to wind the line thereon. A nut 7 serves for operating a primary braking system which also acts so as to make handle 5 and spool 2 integral for rotation during winding of the line on the spool. Handle 5 is further associated with a disk-shaped member 8 which is part of an ancillary braking system operable through the handle itself. The provision of that ancillary braking system is an essential feature of the present invention.

Figure 2:
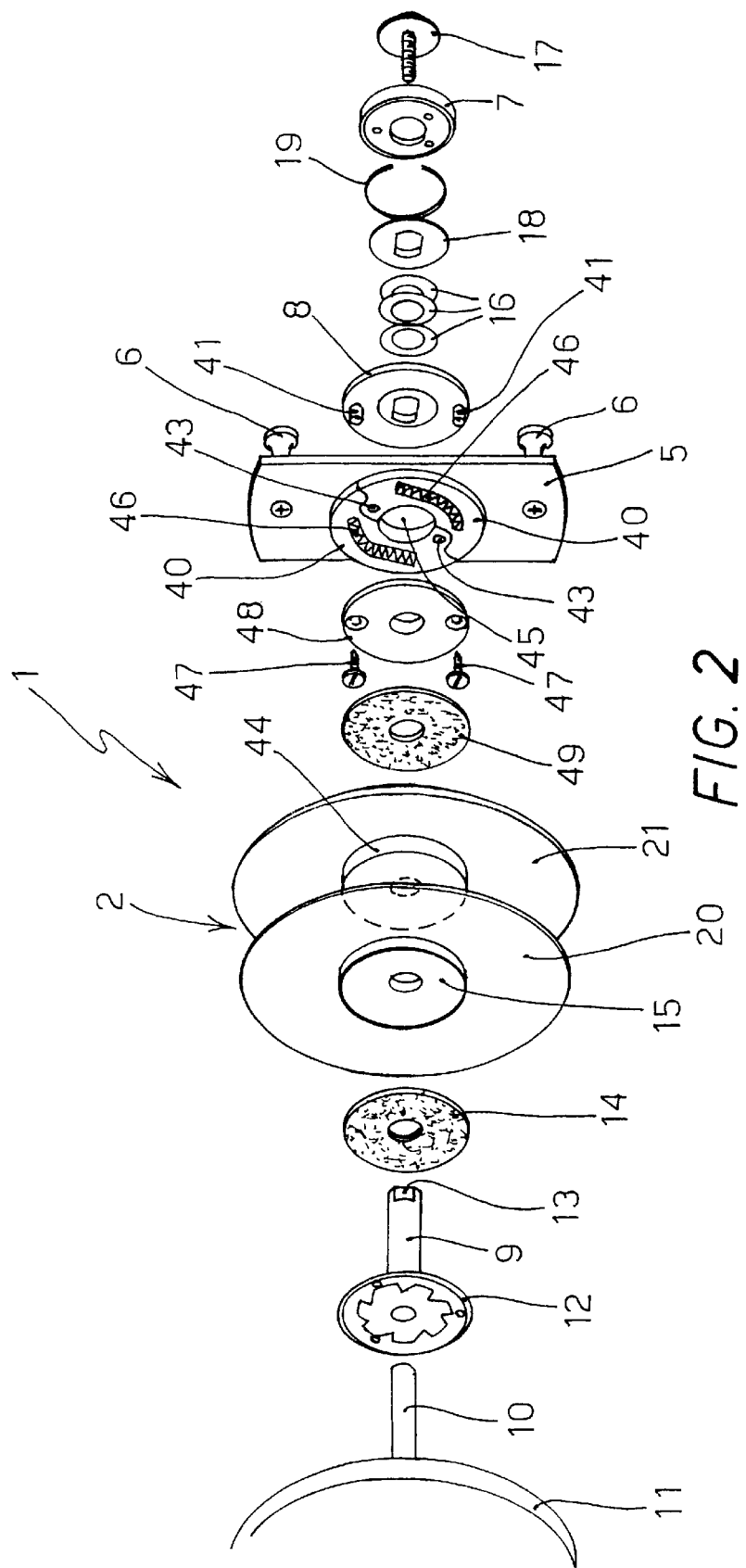
FIG. 2 is an exploded view of the reel according to the present invention.

Referring to FIG. 2, spool 2 is mounted on a sleeve 9 rotatably mounted on a shaft 10 integral with a plate member 11 which is part of frame 3. In quite conventional manner, connection between spool 2 and sleeve 9 is such as to let them rotate as a whole in one direction (in particular the direction required for winding the line on spool 2), and to let spool 2 rotate on sleeve 9 in the opposite direction. The connection is schematized by ratchet wheel 12 provided at one end of sleeve 9. At the opposite end 13, the external surface of sleeve 9 has a non-circular (e.g. square or rectangular) shape. That non-circular shaped end is intended to cooperate with the members of reel 1 which are to be made integral for rotation with sleeve 9, as will be discussed hereinafter. A suitable gasket 14 is arranged between ratchet wheel 12 and the bottom of a seat 15 provided in a facing plate 20 of spool 2.

A set of brake disks 16 forming the primary braking system is arranged between disk 8 and nut 7. An externally threaded member 17, for instance arranged to cooperate with a thread provided internally of end portion 13 of sleeve 9, is joined with nut 7 and allows adjusting the braking action of the primary braking system through nut 7. An axially bored disk 18 is arranged between nut 7 and the set of brake disks 16 and, in the assembled reel, is fastened to nut 7 e.g. through a resilient ring 19. The axial bore of disk 18 is shaped as to match with end portion 13 of sleeve 9, so that the disk can rotate with sleeve 9 and spool 2 during winding of the line. Note that the structure of the primary braking system is known in se and the details shown herein are given only for illustration purposes. In the exemplary embodiment shown here, the primary braking system is assumed to cooperate with disk 8. In particular, by screwing/unscrewing member 17, the pressure of disks 16 on disk 8 can be adjusted so that either the whole of disk 8 and handle 5 can be made integral for rotation with spool 2 for winding the line on the spool, or a relative rotation of the spool and the handle is allowed when the line is being paid out.

Figure 3:
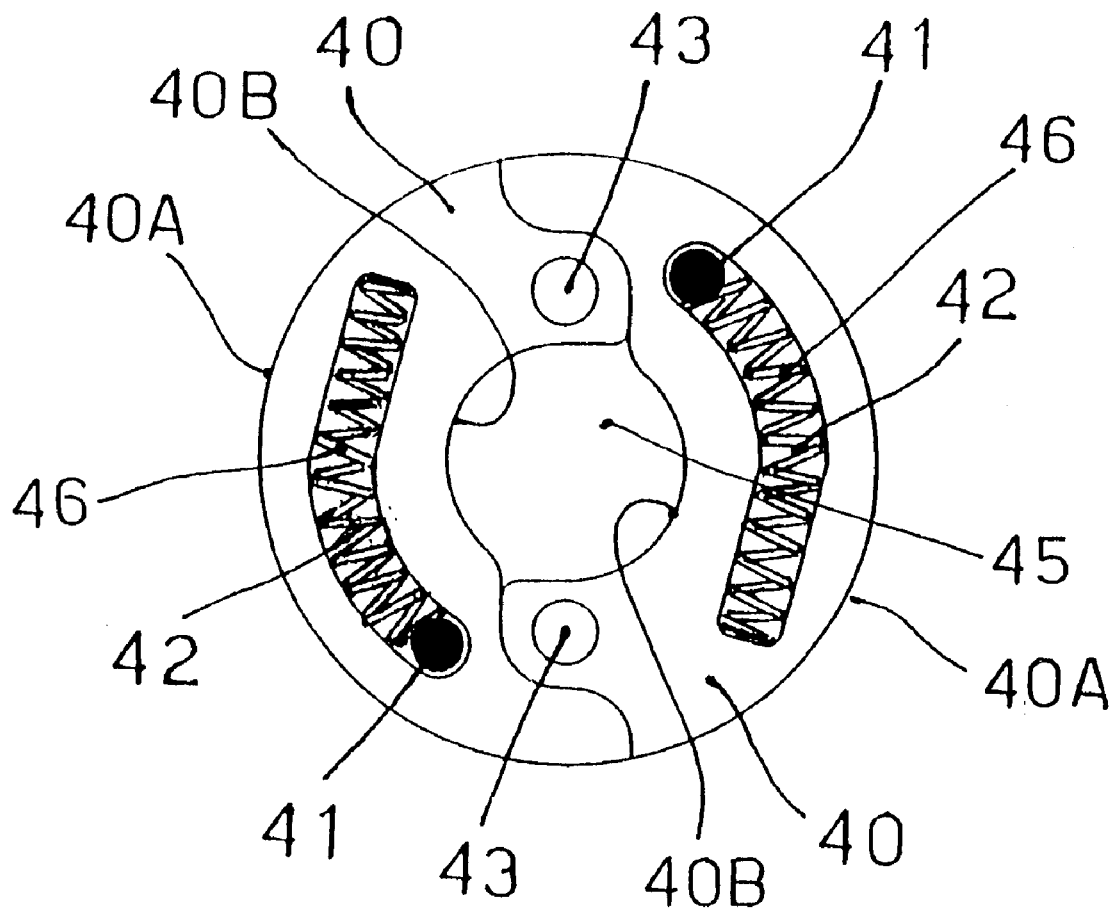
FIG. 3 is an enlarged view of a detail of the ancillary braking mechanism embodied in a reel according to the invention.

Disk 8 above is part of the actuating means of an ancillary braking system which can be operated by the fisherman by acting on handle 5, as mentioned before, by turning it in a direction opposite to that required for winding the line on spool 2. Referring also to FIG. 3, the ancillary braking system further comprises a pair of brake shoes 40 which are eccentrically pivoted at points 43 on the surface of handle 5 opposite to disk 8. In the assembled reel, brake shoes 40 are housed within a circular hollow 44 provided in a facing surface 21 of spool 2. The outer edges 40A of brake shoes 40 are shaped as arcs of circumference, with such a radius that, in inactive condition of the ancillary braking system, said outer edges are spaced apart from the side walls of hollow 44. The inner edges 40B of brake shoes 40 are so shaped as to define a central opening 45 for the passage of sleeve 9. Handle 5 will have a corresponding opening.

Each brake shoe 40 further presents an elongated slot 42 extending for a substantial part of the brake shoe length and having a cam profile. A pair of pins 41 projecting from diametrically opposite positions of the inner surface (i.e. the surface facing handle 5) of disk 8 are arranged to engage slots 42 in the assembled reel, as shown in FIG. 3. More particularly, in an inactive condition of the ancillary braking system, pins 41 are in contact with the slot ends farthest from pivots 43; on the contrary, when the ancillary braking system is operated, pins 41 can slide within slots 42 and, thanks to the cam profile of the slots, cause the pivotal movement of brake shoes 40 about pivot points 43 thereby bringing outer edges 40A of the brake shoes into and out of frictional engagement with the walls of hollow 44. Contrast springs 46 are provided in slots 42 to bring back pins 41 towards their inactive positions when handle 5 is released. Preferably, pins 41 are hollow and internally threaded, and their internal threads are engaged by screws 47 intended to fasten disk 8 with a further disk 48 keeping disk 8 assembled with handle 5.

A gasket 49, similar to gasket 14, is provided between disk 8 and the bottom of hollow 44.

The operation of the reel will now be described. For winding the line on the spool, screw member 17 is screwed into sleeve 9 so that the whole of the reel elements are tightly joined together and rotation of handle 5 is transmitted both to spool 2 and to disks 8, 18, thereby causing rotation of sleeve 9. During payout of the line, when no adjustable braking action is required (e. g. for the cast) the pressure of brake disks 16 of the primary braking system is released to such an extent that spool 2 can rotate on sleeve 9, while handle 5 and disks 8, 48 remain stationary. When a fish is hooked and frequent adjustments of the braking force are required, the force exerted by disks 16 is first set to a desired value which slows down rotation of spool 2, still allowing relative movement of spool 2 and handle 5. That primary braking force is then kept constant and any adjustment of the overall braking action is achieved through the ancillary braking system.

More particularly, to increase the overall braking action beyond that exerted by the primary braking system, handle 5 is rotated in opposite direction to that required for winding, as already mentioned. During such rotation, disk 8 remains stationary since sleeve 9 is blocked by ratchet wheel 12. Since brake shoes 40 are integral for rotation with handle 5, this results in pins 41 moving along cam slots 42 and causing the pivotal movement of brake shoes 40 about pivots 43. Thus shoes 40 become spaced apart and their outer edges 40A engage the side walls of hollow 44, thereby exerting a braking action. The intensity of the braking action exerted by brake shoes 40 is directly related with the amount of rotation of handle 5. Any further adjustment of the overall braking action will require either further rotating handle 5 as before, so as to bring the brake shoes in stronger engagement with the walls of their seat, or releasing the handle. When handle 5 is released, springs 46 move pins 41 towards their inactive condition at the end of slots 42, causing the inverse pivotal movement of the brake shoes whose outer edges progressively move away from the walls of the seat, thus progressively releasing the braking action.

Thus the invention provides an ancillary braking system which allows controlling the payout of the line by modulating the braking action on such line by acting on the winding handle. Thus the fisherman is no longer compelled to leave the winding handle in order to intervene on the primary braking system, so that the risk of losing the control on a hooked fish is substantially eliminated.

It is also to be appreciated that the ancillary braking system of the invention is suitable for use both by left-hand and right-hand people: passing from one version to the other merely requires a mutual exchange of the brake shoe positions, as can be deduced from a comparison of FIG. 2, which shows a right-hand operable reel, and FIG. 3 which refers to a left-hand operable arrangement.

It is clear that the above description is given only by way of non-limiting example and that changes and modifications which are in the reach of those skilled in the art can be made without departing from the scope of the invention. In particular, the components of the ancillary braking system may be replaced by other ones having the same effects as those described here. Other geometrical shapes for said components can be employed. Moreover, brake shoes 40 and/or seat 44 might have cooperating surfaces suitably worked or provided with suitable coating so as to enhance the braking effect. Furthermore, even if a cooperation between the primary and ancillary braking systems through disk 8 has been assumed, other arrangements of the primary braking system can be envisaged.

What I claim is:

1. A fly-fishing reel including:

a line spool;

a frame on which said spool is rotatably mounted so as to allow pay out and winding of the line;

means for securing frame to a fishing rod;

a handle for rotating the spool in a first direction in order to wind the line on the spool;

primary braking means arranged to exert a first braking action on said spool and equipped with actuating means operated independently from said handle, the primary braking action being adjustable so as to make said spool and said handle integral for rotation in said first direction or to let the spool rotate relative to the handle when the line is being paid out; and ancillary braking means operable in addition to said primary braking means to exert a second adjustable braking action on said spool, said second ancillary braking means being operatively connected to said handle so as to be operated by said handle upon rotation thereof in a second direction, opposite to the first one.

2. A fly-fishing reel as claimed in claim 1, wherein the ancillary braking means comprise:

a pair of brake shoes which are fastened on said handle so as to be integral for rotation with the handle and are arranged so as to be housed within a hollow in the spool, said brake shoes being fastened on said handle through eccentrically located pivot means, whereby said brake shoes are pivotally movable on said handle between an inactive condition, in which outer edges of the brake shoes are spaced apart from a confronting wall of said hollow, and a braking condition, in which said outer edges frictionally engage said confronting wall of said hollow; and means for causing a pivotal movement of said brake shoes on the handle in order to move the brake shoes from the inactive condition to the braking condition upon rotation of the handle in said second direction, and to bring back the brake shoes towards the inactive condition when the handle is released.

3. A fly fishing reel according to claim 2, wherein said means for causing the pivotal movement of the brake shoes comprises a pair of pins each engaging a slot provided in a respective one of said brake shoe, said pins projecting from a member which is integral for rotation with the handle and the brake shoes when the handle is rotated in said first direction, and which remains stationary when the handle is rotated in said second direction, and said slots having a cam profile such that relative movement of the handle and the brake shoes with respect to the pins causes the pivotal movement of the brake shoes.

4. A fly-fishing reel as claimed in claim 2 or 3, wherein contrast springs are provided in said slots to bring again said pins towards a position corresponding to said inactive condition when the handle is released.

5. A fly fishing reel as claimed in claim 2, wherein said primary braking system includes brake disks cooperating with said means for causing the pivotal movement of the brake shoes, so as to either cause joint rotation of said handle and said spool in said first direction or to let the spool rotate relative to said handle.

* * * * *